C. J. CONVERSE.
MILLING TOOL.
APPLICATION FILED OCT. 20, 1920.
1,423,192.
Patented July 18, 1922.
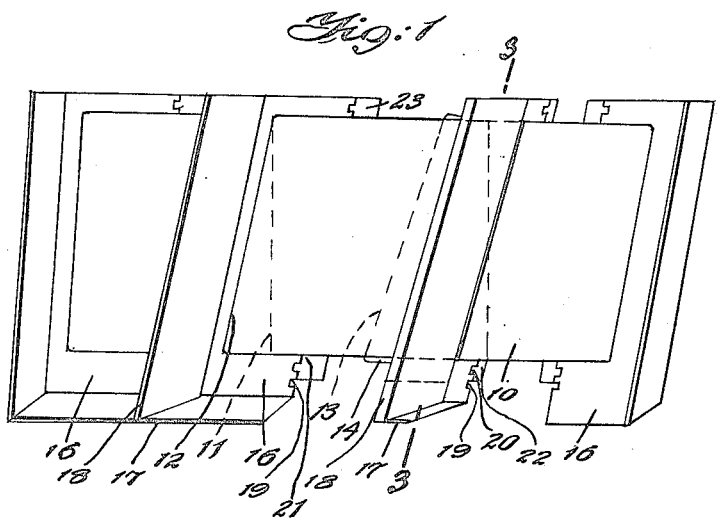
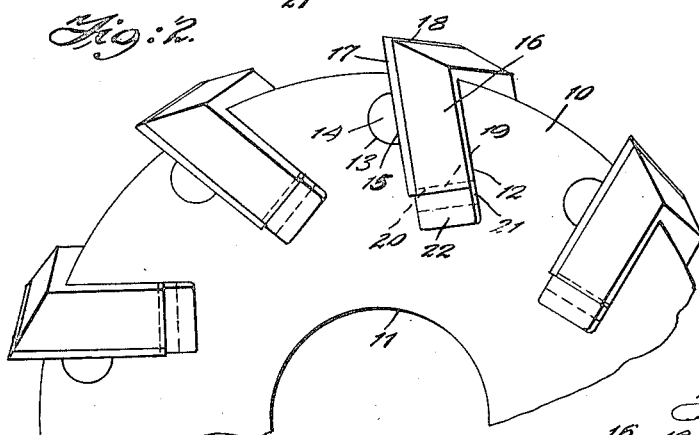
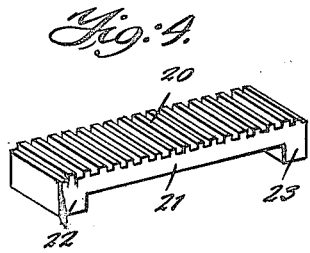
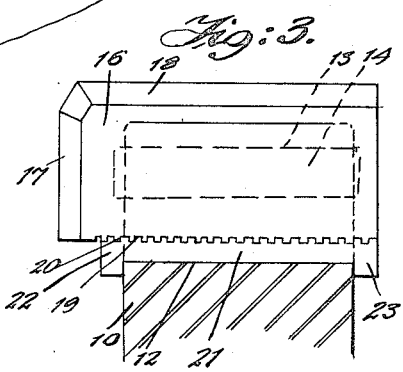
INVENTOR.
Clinton J. Converse
BY
ATTORNEYS.

UNITED STATES PATENT OFFICE.

CLINTON J. CONVERSE, OF BRIDGEPORT, CONNECTICUT.

MILLING TOOL.

1,423,192.        Specification of Letters Patent.      Patented July 18, 1922.

Application filed October 20, 1920. Serial No. 418,244.

*To all whom it may concern:*

Be it known that I, CLINTON J. CONVERSE, a citizen of the United States, and a resident of Bridgeport, in the county of Fairfield and State of Connecticut, have invented certain new and useful Improvements in Milling Tools, of which the following is a specification.

The present invention relates to improvements in milling-tools, and especially to the type of high speed milling cutters in which a plurality of removable teeth or blades are mounted upon a circular body or holder. Such tools are for the most part employed in heavy cutting work, and it is an important consideration that the teeth or blades be mounted in such manner that they will not only be firmly supported, to withstand the enormous strains put upon them in heavy duty, but that the cutting edges shall be presented to the work in proper relation to obtain the maximum cutting result, vibratory forces, end pressure, and other conditions of service being considered.

Various attempts have been made in the past to meet these conditions, and with more or less success, but as far as I am aware, the structures devised have not combined in a tool of this character the several advantages that I propose to obtain with my improvements.

Among the objects and advantages contemplated in the present embodiment of my invention is the provision of a milling tool in which the cutting teeth or blades will be adjustable in relatively fine increments, but in which the presence of adjustment means does not sacrifice the solidity and strength essential to efficient cutting. To this end I propose especially to dispense with the use of screws, dowels, or like means, which become loosened through vibratory or other forces.

Another important object is to provide a tool which may be reground a great many times without in any way impairing the strength of the structure and its cutting efficiency. A further object is to provide a tool having a maximum frictional resistance, an important consideration in side and straddle cutting. I also propose to provide a tool of simple construction, adapted to economical and practical manufacturing methods.

With these and other objects in view, an embodiment of my invention is shown in the accompanying drawings and this embodiment will be hereinafter more fully described with reference thereto, and the invention will be finally pointed out in the claims.

In the accompanying drawings—

Fig. 1 is a side elevation of a milling tool embodying the invention.

Fig. 2 is a face view thereof, partially broken away.

Fig. 3 is a sectional view taken along the line 3—3 of Fig. 1.

Fig. 4 is a perspective view of the shoe employed.

Similar reference characters indicate corresponding parts throughout the several figures of the drawings.

Referring to the drawings the embodiment of my invention shown therein, comprises a rotary body or holder 10 of disk-shape, having an axial bore 11 for mounting upon a suitable spindle, and provided in spaced relation in its peripheral portion with a series of equally spaced slots or channels 12, shown in the spaced slots or channels 12, shown in the present embodiment as inclined to radii of the body, and inclined transversely of the peripheral surface. It will be understood that except as regards certain novel results of the combinative relation of this arrangement with certain other features of the invention as will hereinafter appear, such arrangement may be considered as arbitrary. Thus for instance, the slots may be radial and longitudinal of the axis of the holder, or under certain conditions they may be convergingly or divergingly arranged relative to each other.

Within one side wall of each of the slots 12 there is provided a socket 13, slightly tapered, or it may be cylindric, with its axis slightly inclined to the wall of the slot. A wedge-pin 14 is adapted to be fitted into the socket 13, with its flat face 15 engaging the side of the tooth or blade, as will hereinafter be more fully pointed out.

The tooth or blade consists of a solid block 16, preferably of high speed steel, having face and peripheral cutting edges 17 and 18 with liberal rake, the base of the block being provided with transverse serrations 19, preferably having their vertical sides right-angular to their upper and lower horizontal surfaces.

The serrations of the tooth are adapted, when the same is engaged in a slot of the holder, to interlockingly engage the complementary serrations 20 of a shoe 21, disposed in the base of the slot, and provided at its projecting ends with depending locking flanges 22 and 23, which engage the inner and outer faces of the holder.

In operation, the tooth is disposed within the slot of the holder with its face cutting edge 17 projecting beyond the end of the shoe 21, being securely held in place by the wedge-pin, which is tapped tightly into wedging engagement with the tooth. The pin may be readily removed by means of a suitable drift applied at its reduced end. It should be here stated that the holding means consisting of a wedge-pin, as shown, is not essential, and any other suitable means for performing the same function may be resorted to.

The interlocking relation of the tooth and shoe positively prevents any shifting tendency which might result from side strain, while the solidity of the tooth and its support by the holder, present an absolutely rigid structure, having a maximum resistance component. The structure is entirely free of any parts that might be loosened by vibratory forces.

In order to adjust the tooth for grinding, the same is loosened by removal of the wedge-pin, is lifted from the shoe to disengage the serrations, and is shifted to the desired position of adjustment; and thereupon, it is again interlocked with the shoe and secured by the wedge-pin. For slotting operations the alternate teeth may be adjusted in opposite directions to vary the width of the slot; and also, the teeth may be otherwise suitably arranged, as by providing opposed alternate teeth, and parallel or divergent slots, the parallel slots being longitudinal to the axis of the holder.

With my improvements, a milling-tool is provided in which great rigidity is obtained, and in which the maximum strength of the tool is utilized in direct opposition to the strains put upon it. The manner in which the wedge-pin is engaged directly with the cutting blade, and without the use of a secondary piece, contributes to the rigidity, the surface contact over the entire flat surface of the wedge, providing a solid backing and a frictional gripping relation, without interference from any other part. The force of cutting strains upon the blades being substantially longitudinal to the flat surface of the wedge-pin, toward its small end, the tendency is to increase the wedging action as strains are increased. Again greater rigidity is obtained through the locking of the blades against rearward movement by the shoe. As cutting pressure is applied to the ends of the blades, the strain due to the angle of the slots is against the solid body, or holder, and the blades are therefore practically as rigid as though they were one with the body.

The provision of serrations in the bottom of the blades prevents the possibility of fracture, such as might occur if the serrations were provided upon the back or front faces, the greater depth of the blade providing a surplus of metal above the serrations; and, the direct engagement of the side surfaces of the blades with the body, provides a solid backing without the weakening influence of intermediate pieces. The cutter will stand up rigidly under the very heaviest cutting operations with full efficiency and without impairment due to the presence of the adjustment means.

I have illustrated and described a preferred and satisfactory embodiment of my invention, but it is obvious that changes may be made therein, within the spirit and scope thereof as defined in the appended claims.

I claim:

1. A milling tool comprising a body, a tooth mounted rigidly and releasably in the body, and means having rigid connection with the body and so interlocked with the body to avoid movement thereof in the direction of the axis of the body, said means having interlocking detachable engagement with said tooth and adapted when detached from said tooth to permit the tooth to be moved approximately parallel with the axis of the body at the same time permitting of its interlocking engagement in various positions of axial adjustment.

2. In a milling-tool, a body having peripheral slots, removable cutting teeth adapted to be inserted in said slots, interlocking connection means between said teeth and said slots adapted when detached from said tooth to permit adjustment of said teeth in said slots in a direction approximately parallel with the axis of the body and means adapted to secure the teeth in said slots.

3. In a milling-tool, a body having peripheral slots, removable cutting teeth adapted to be inserted in said slots, interlocking connection means cooperating between the under surface of said teeth and the base of said slots adapted to prevent longitudinal shifting of said teeth when engaged and to permit longitudinal adjustment when disengaged, and means adapted to secure the teeth in the slots.

4. In a milling-tool, a body having peripheral slots, removable cutting teeth adapted to be inserted in said slots, and a shoe disposed between the under surface of said teeth and the base of said slots having an interlocking connection with said teeth and adapted to prevent longitudinal shifting thereof.

5. In a milling-tool, a body having peripheral slots, removable cutting teeth adapted to be inserted in said slots, and having a serrated under surface, and a shoe disposed between the under surface of said teeth and the base of said slots having a serrated upper surface interlockingly engaged with the serrations of said teeth and adapted to prevent longitudinal shifting thereof.

6. In a milling-tool, a body having peripheral slots, removable cutting teeth adapted to be inserted in said slots, a shoe disposed between the under surface of said teeth and the base of said slots having locking flanges at its ends engaging the inner and outer surfaces of said body, and interlocking connection means between said teeth and said shoes.

7. In a milling-tool, a body having peripheral slots, removable cutting teeth adapted to be inserted in said slots, interlocking connection means between the under surface of said teeth and the base of the slots, and a wedge-pin disposed in one side wall of said slots and adapted to engage said teeth exteriorly.

In testimony that I claim the foregoing as my invention, I have signed my name hereunder.

CLINTON J. CONVERSE.